A. C. FLETCHER.
COTTON BALE TIE.
No. 74,070. Patented Feb. 4, 1868.
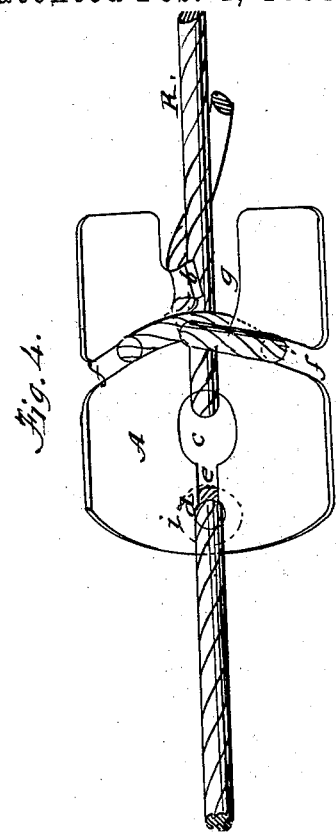
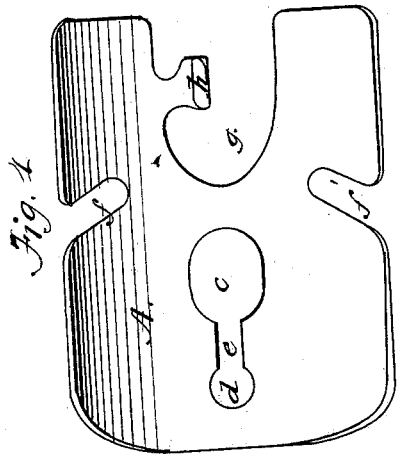
Attest:
J. W. Coomly.
G. W. Reed.
Addison C. Fletcher.

United States Patent Office.

ADDISON C. FLETCHER, OF NEW YORK, N. Y.

Letters Patent No. 74,070, dated February 4, 1868; antedated January 23, 1868.

---

IMPROVEMENT IN COTTON-BALE TIES.

---

The Schedule referred to in these Letters Patent and making part of the same.

---

TO ALL WHOM IT MAY CONCERN:

Be it known that I, ADDISON C. FLETCHER, of the city, county, and State of New York, have invented a certain new and useful Improvement on Fasteners for Bales and other packages, of which the following is a full, clear, and exact description, reference being had to the accompanying drawing, forming part of this specification, and in which—

Figure 1 represents an outside face view of my improved bale and other fastener.

Figure 2, an end view of the same.

Figure 3, a longitudinal section thereof; and

Figure 4, a similar view to fig. 1, with a tying or baling-rope as applied to the fastener.

Like letters indicate corresponding parts throughout the several figures.

The nature of my invention, which relates to a fastener applicable not only to bales, but also various descriptions of packages, consists in a peculiarly-constructed slotted plate, through which the baling or fastening-rope is passed and held, say, by lock within it of a knot at its one end, while the other end of said rope, in establishing the tie, is variously passed and crossed through certain of the slots, so as to effectually secure the tie, but admitting of its being readily unfastened without cutting, injuring, or destroying the rope, that may thus be used over and over again, as may also the fastener, either in connection with the same, or longer or shorter rope, as required, the attachment to and detachment from of the latter to the plate being easily and readily effected.

Referring to the accompanying drawing, A represents a plate or piece of sheet metal, formed or moulded, and cut or pierced, it may be by dies or otherwise, of a waved contour in its transverse section, so as to rest, when applied to a bale or package, on points or surfaces, as with an intermediate hollow, $b$, and having at or near one end a key-hole-shaped aperture or large and small openings, $c\ d$, united by a groove, $e$, also oblique lateral openings, $f\ f'$, and at or near the opposite end to the openings $c\ d$ a cavity, $g$, with a lateral bent or curved ear, $h$.

In applying this fastening to a bale or package, the one end of the baling or tying-rope R, as shown in fig. 4, is knotted, as at $i$, said knot being first entered through the opening $c$, and the rope slipped along the groove $e$ into the opening $d$, and there held by the knot $i$, binding against or on the under side of the plate. The rope then, which is passed around the bale or package, may have its opposite end fastened in various ways by passing it through the openings $f\ f'$ and $g$, and over the ear $h$, but I prefer to fasten the said end by first drawing it along or into the cavity $g$, then passing it over a bridge or division separating the cavity $g$ and opening $c$ back again, drawing on or tightening up the rope under the same bridge into the cavity $g$, over the plate into the oblique lateral opening $f'$, back again under the plate into the same cavity $g$, then over the plate into the opposite lateral opening $f$, after which it may be passed back under the plate into the cavity $g$, and from thence turned up and forced into and along the bent ear $h$, when by simply wrapping it around or under the straight portion of the rope, and pulling on or up the wrap, the tie will be secured without objectionable knotting, and so that, though holding fast, it may readily be loosened without cutting or injury to the rope, that when untied may be used over again for a like purpose, or be withdrawn, and if requisite, longer or shorter rope be substituted by releasing or withdrawing the knot $i$ from its lock with the plate, by drawing the knotted end of the rope out of the opening $d$, along the groove $e$, and out through the aperture $c$.

What I claim as my invention, and desire to secure by Letters Patent, is—

The plate A, having an aperture, $c\ e\ d$, lateral side openings $f\ f'$, opening $g$, and lip $h$, for operation in connection with a rope or equivalent material, substantially as set forth.

ADDISON C. FLETCHER.

Witnesses:
J. W. COOMBS,
G. W. REED.